US005370813A

United States Patent [19]

DeNicola, Jr. et al.

[11] Patent Number: 5,370,813
[45] Date of Patent: Dec. 6, 1994

[54] HEAT RESISTANT COMPOSITION OF POLYPHENYLENE ETHER AND/OR POLYSTYRENE BLOCK COPOLYMER(S) AND STYRENIC GRAFTED PROPYLENE POLYMER

[75] Inventors: Anthony J. DeNicola, Jr., Newark; Ralph A. Guyer, Wilmington, both of Del.

[73] Assignee: Himont Incorporated, Wilmington, Del.

[21] Appl. No.: 202,846

[22] Filed: Feb. 25, 1994

Related U.S. Application Data

[63] Continuation of Ser. No. 956,441, Oct. 2, 1992, abandoned, which is a continuation of Ser. No. 499,133, Mar. 26, 1990, abandoned.

[51] Int. Cl.$^5$ ............... C08L 71/12; C08L 25/04; C08L 51/06; C08L 53/02
[52] U.S. Cl. .......................... 525/68; 525/69; 525/71; 525/86; 525/88; 525/89; 525/92; 525/93; 525/98; 525/905
[58] Field of Search ............... 525/68, 69, 71, 86, 525/88, 89, 92, 93, 98, 905

[56] References Cited

U.S. PATENT DOCUMENTS

| | | | |
|---|---|---|---|
| 3,361,851 | 1/1968 | Gowan | 524/508 |
| 3,383,435 | 5/1968 | Cizek | 525/132 |
| 3,658,945 | 4/1972 | Nakashio et al. | 525/68 |
| 3,943,191 | 3/1976 | Cooper et al. | 525/68 |
| 4,166,055 | 8/1979 | Lee | 525/92 |
| 4,172,826 | 10/1979 | Haaf et al. | 525/96 |
| 4,383,082 | 5/1983 | Lee | 525/92 |
| 4,483,958 | 11/1984 | Kosaka et al. | 524/409 |
| 4,713,416 | 12/1987 | Del Giudice et al. | 525/68 |
| 4,764,559 | 8/1988 | Yamauchi et al. | 525/92 |
| 4,892,904 | 1/1990 | Ting | 525/68 |
| 5,061,753 | 10/1991 | Maruyama et al. | 525/68 |
| 5,071,912 | 12/1991 | Furuta et al. | 525/68 |
| 5,075,376 | 12/1991 | Furuta et al. | 525/68 |
| 5,132,363 | 7/1992 | Furuta et al. | 525/68 |
| 5,140,074 | 8/1992 | DeNicola, Jr. et al. | 525/263 |
| 5,159,004 | 10/1992 | Furuta et al. | 525/68 |

FOREIGN PATENT DOCUMENTS

| | | |
|---|---|---|
| 0209874 | 1/1987 | European Pat. Off. |
| 263678 | 4/1988 | European Pat. Off. |
| 0292153 | 11/1988 | European Pat. Off. |
| 0379286 | 7/1990 | European Pat. Off. |
| 0388926 | 9/1990 | European Pat. Off. |

*Primary Examiner*—James J. Seidleck
*Assistant Examiner*—M. L. Warzel

[57] ABSTRACT

Disclosed are resin compositions comprising (a) a polyphenylene ether resin, a styrene resin or mixtures thereof, (b) a styrenic grafted propylene polymer material, (c) one or more monoalkenyl aromatic hydrocarbon-conjugated diene block copolymers, hydrogenated products thereof or mixtures thereof, and optionally, (d) a propylene polymer material.

24 Claims, No Drawings

HEAT RESISTANT COMPOSITION OF POLYPHENYLENE ETHER AND/OR POLYSTYRENE BLOCK COPOLYMER(S) AND STYRENIC GRAFTED PROPYLENE POLYMER

This application is a continuation of application Ser. No. 07/956,441, filed Oct. 2, 1992, now abandoned, which is a continuation of application Ser. No. 07/499,133 filed Mar. 26, 1990, now abandoned.

FIELD OF THE INVENTION

This invention relates to compositions comprising (a) a polyphenylene ether resin, a styrene resin or mixtures thereof, (b) a styrenic grafted propylene polymer material, (c) one or more monoalkenyl aromatic hydrocarbon-conjugated diene block copolymers, hydrogenated products thereof or mixtures thereof, and, optionally, (d) a propylene polymer material.

BACKGROUND OF THE INVENTION

Polyphenylene ether resin, also known as polyphenylene oxide, is recognized in the art as an engineering plastic having excellent high heat distortion temperature, high stiffness and high strength at elevated temperatures. However, it has the drawbacks of poor impact strength, poor processibility due to high melt and glass transition temperatures and poor chemical resistance thereby limiting its field of application.

In an attempt to overcome these drawbacks, polyphenylene ether resin has been blended with other resins. For example, U.S. Pat. No. 3,383,435 discloses a composition comprising polyphenylene ether resin and a polystyrene or a rubber-modified styrene resin, wherein the rubber component is a highly unsaturated rubber, such as, polybutadiene. U.S. Pat. No. 3,658,945 and 3,943,191 disclose compositions comprising polyphenylene ether resin and an EPDM-modified styrene resin. In these patents the EPDM rubber replaces the highly unsaturated rubber used in the U.S. Pat. No. 3,383,435 in an attempt to increase the impact strength. However, no significant improvement was achieved.

Other compositions have been disclosed comprising a polyphenylene ether resin and an EPDM-modified styrene resin with additional components. U.S. Pat. No. 4,172,826 discloses compositions comprising polyphenylene ether resin, EPDM-modified styrene resin, hydrogenated A-B-A block copolymers and, optionally, a filler. In U.S. Pat. No. 4,483,958 the composition disclosed comprises polyphenylene ether resin, EPDM-modified styrene resin, an inorganic filler and a thermoplastic elastomer selected from styrene-conjugated diolefin copolymers and styrene polymer grafted polyolefin.

Various blend compositions of polyolefins and polyphenylene ether resins have been made in an attempt to improve properties, such as impact strength, chemical resistance and melt processibility of polyphenylene ether resins. For example, U.S. Pat. No. 3,361,851 to Gowan discloses a composition comprising polyphenylene ether resin and polypropylene, wherein a small quantity of polypropylene is dispersed in the polyphenylene ether resin. The reference teaches that the amount of the polypropylene that can be incorporated is limited to no more than 10% by weight of the total composition and that incorporating amounts of polypropylene exceeding 10% results in phase separation during the molding of such compositions and delamination of the molded articles.

It has also been disclosed that larger amounts of polypropylene can be incorporated in polyphenylene ether resin compositions if elastomeric block copolymers are present and, optionally, polystyrene. Compositions of this kind are described in U.S. Pat. No. 4,166,055; 4,764,559 and 4,383,082 and EPA 263678. These patents teach improved compatibility between the polyolefin and polyphenylene ether and improved impact strength. However, there is a substantial decrease in flexural modulus and heat distortion temperature.

U.S. Pat. No. 4,713,416 to Del Giudice et al. discloses a composition of (a) polyphenylene ether resin, (b) a thermoplastic copolymer other than polystyrene that is incompatible with polyphenylene ether resins, such as crystalline olefin polymers, polycarbonates, aromatic polyesters and polyamides, and (c) a compatibility promoting agent. When the incompatible thermoplastic copolymer is a crystalline olefin polymer the reference teaches using either (a) block copolymers consisting of a vinyl aromatic monomer and a crystalline olefin or (b) the product obtained by grafting a vinyl aromatic monomer onto a crystalline polymer of a $C_2$–$C_6$ olefin.

SUMMARY OF THE INVENTION

It has been found that compositions comprising (a) a polyphenylene ether resin, a styrene resin or mixtures thereof, (b) a styrenic grafted propylene polymer material, (c) one or more monoalkenyl aromatic hydrocarbon-conjugated diene block copolymers, hydrogenated products thereof or mixtures thereof, and optionally (d) a propylene polymer material exhibit excellent retention of heat resistance, high stiffness and tensile strength at elevated temperatures, high chemical resistance, good gloss and surface appearance, melt processibility and high impact strength, as well as, improved compatibility.

One embodiment of the invention provides compositions comprising, by weight, (a) from 10 to 65% of a polyphenylene ether resin, a styrene resin or a mixture thereof, (b) from 30 to 75% of a styrenic grafted propylene polymer material, and (c) from 1 to 15% of one or more monoalkenyl aromatic hydrocarbon-conjugated diene block copolymers, hydrogenated products thereof or mixtures thereof, wherein the total amount of (a)+(b)+(c) is 100%.

Another embodiment of the invention provides compositions comprising (a) from 10 to 65% of a polyphenylene ether resin, a styrene resin or mixtures thereof, (b) from 5 to 30% of a styrenic grafted propylene polymer material, (c) from 1 to 15% of one or more monoalkenyl aromatic hydrocarbon-conjugated diene block copolymers, hydrogenated products thereof or mixtures thereof, and (d) from 1 to 70% of a propylene polymer material, wherein the total amount of (a)+(b)+(c)+(d) is 100%.

The compositions of the invention are useful in the manufacture of molded articles, such as automotive parts, appliances and motor housings.

DETAILED DESCRIPTION OF THE INVENTION

Unless otherwise specified all percentages and parts are by weight in this specification.

The polyphenylene ether resin of component (a) is a homo- or copolymer selected from those having the repeating structural units of the formula:

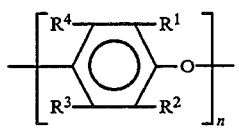

wherein the oxygen ether atom of one unit is connected to the benzene nucleus of the next adjoining unit, n is a positive integer higher than 50, $R_1$, $R_2$, $R_3$, and $R_4$, the same or different from each other, are hydrogen, halogen, hydrocarbon radicals, halohydrocarbon radicals, or halohydrocarboxylic radicals containing at least two carbon atoms between the benzene nucleus and the halogen atom. The preparation of polyphenylene ether resins corresponding to the above structural formula is described in U.S. Pat. Nos. 3,306,874, 3,306,875, 3,257,357 and 3,257,358.

When the resin material of component (a) is a styrene resin, it is selected from crystal styrene homopolymer, high impact polystyrene, alkyl ring-substituted styrene homopolymer where the alkyl is methyl or ethyl, styrene/alkyl ring-substituted styrene copolymers and styrene/alpha-methylstyrene copolymers.

The component (a) according to the present invention may also be a mixture of the above-described polyphenylene ether resin and styrene resin. The proportion of the styrene resin in the mixture is from 2 to 98% based on the total amount of the polyphenylene ether resin and styrene resin, preferably the styrene resin in the mixture is 10 to 60%.

Component (a) of the invention is present in the amount of 10 to 65% by weight, preferably, from 20 to 60%, most preferably from 30 to 60% based on the total composition.

Component (b) of the present invention is a styrenic grafted propylene polymer material. Styrenic grafted propylene polymer material as used in this specification means those grafted propylene polymer materials where the styrenic grafting monomer is styrene, an alkyl ring-substituted styrene where the alkyl is methyl or ethyl, combinations thereof wherein the alkyl ring-substituted styrene is present in an amount of from 5 to 95%, or a combination of styrene or an alkyl ring-substituted styrene with 5 to 40% of alpha-methylstyrene or alpha-methyl styrene derivatives. Preferred grafting monomers are styrene and mixtures of styrene and alpha-methylstyrene.

The propylene polymer material backbone of component (b) can be (i) a homopolymer of propylene, (ii) a random copolymer of propylene and an olefin selected from ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16%, (iii) a random terpolymer of propylene with two alpha-olefins selected from the group consisting of ethylene and $C_4$–$C_8$ alpha-olefin, provided that the maximum polymerized $C_4$–$C_8$ alpha-olefin content is about 20%, preferably about 16%, and when ethylene is one of said alpha-olefins, the maximum polymerized ethylene content is about 5%, preferably about 4%, (iv) a homopolymer of (i) or a random copolymer of (ii) impact-modified with from about 5 to 30% of an ethylene-propylene copolymer rubber, or an ethylene-propylene-non-conjugated diene monomer rubber having a diene content of about 2–8%. The ethylene content of (iv) being from about 20 to about 70%. The $C_4$–$C_{10}$ alpha-olefins include linear and branched $C_4$–$C_{10}$ alpha-olefins such as 1-butene, 1-pentene, 4-methylpentene-1, 3-methyl-1-butene, 1-hexene, 3,4-dimethyl-1-butene, 1-heptene, 3-methyl-1-hexene, 1-octene, and the like.

Suitable particulate forms of the grafted propylene polymer material include powder, flake, granulate, spherical, cubic and the like. Spherical particulate forms prepared from a propylene polymer material having a pore volume fraction of at least about 0.07 are preferred.

Most preferred for preparing the grafted propylene polymer material is a propylene polymer material having (1) a weight average diameter of about 0.4 to 7 mm, (2) a surface area of at least 0.1 $m^2/g$, and (3) a pore volume fraction of at least about 0.07 wherein more than 40% of the pores in the particle have a diameter larger than 1 micron. Such propylene polymer materials are commercially available from HIMONT Italia, S.p.A.

The styrene monomer, alkyl ring-substituted styrene monomer or methylstyrene derivative, except alpha-methylstyrene, can be used alone or in combination with each other or with alpha-methylstyrene to graft onto the propylene polymer material backbone. All except alphamethylstyrene and its derivatives readily homopolymerize when used alone and graft copolymerize with each other when two or more are present, including alpha-methylstyrene.

Preferred styrenic grafted propylene polymer materials of the present invention are grafted copolymers of styrene or of styrene and a methylstyrene derivative monomer on polypropylene or on an impact-modified polypropylene backbone.

The styrenic grafted propylene polymer material of the present invention is prepared by the free-radical-initiated graft polymerization of at least one vinyl monomer, at free-radical sites on propylene polymer material. The free-radical sites may be produced by irradiation or by a free-radical generating chemical material, e.g., by reaction with a suitable organic peroxide.

According to the method where the free-radical sites are produced by irradiation, the propylene polymer material, preferably in particulate form, is irradiated at a temperature in the range of about 10° to 85° C. with high-energy ionizing radiation to produce free-radical sites in the propylene polymer material. The irradiated propylene polymer material, while being maintained in a substantially non-oxidizing atmosphere, e.g., under inert gas, is then treated at a temperature up to about 100° C. for a period of at least about 3 minutes, with about from 5 to 80% of the particular grafting monomer or monomers used, based on the total weight of propylene polymer material and grafting monomer(s). After the propylene polymer material has been exposed to the monomer for the selected period of time, simultaneously or successively in optional order, the resultant grafted propylene polymer material, while still maintained in a substantially non-oxidizing environment, is treated to deactivate substantially all of the residual free radicals therein, and any unreacted grafting monomer is removed from said material.

The free-radical deactivation of the resulting graft copolymer is conducted preferably by heating, although it can be accomplished by the use of an additive, e.g., methyl-mercaptan, that functions as a free-radical trap. Typically the deactivation temperature will be at least 110° C., preferably at least 120° C. Heating at the deactivation temperature for at least 20 minutes is generally sufficient.

Any unreacted grafting monomer is removed from the graft copolymer, either before or after the radical deactivation, or at the same time as deactivation. If the removal is effected before or during deactivation, a substantially non-oxidizing environment is maintained.

In the method where the free-radical sites are produced by an organic chemical compound, the organic chemical compound, preferably an organic peroxide, is a free-radical polymerization initiator which has a decomposition half-life of about 1 to 240 minutes at the temperature employed during the treatment. Suitable organic peroxides include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethylcyclohexane, 2,5-dimethyl-2,5-di-tert-butyl-peroxyhexane, and bis(alpha-tert-butylperoxyisopropylbenzene); peroxy esters, such as tert-butylperoxypivalate, tert-butyl perbenzoate, 2,5-dimethylhexyl 2,5-di(perbenzoate), tert-butyl-di(perphthalate), tert-butylperoxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. The peroxides can be used neat or in a diluent medium, having an active concentration of from 0.1 to 6.0 pph, preferably from 0.2 to 3.0 pph.

According to this method, the propylene polymer material, preferably in particulate form, at a temperature of from about 60° C. to 125° C. is treated with from 0.1 to 6.0 pph of a free-radical polymerization initiator described above. The polymer material is treated with about 5 to 240 pph of a grafting monomer at a rate of addition that does not exceed 4.5 pph per minute at all addition levels of 5 to 240 pph of the monomer, over a period of time which coincides with, or follows, the period of treatment with the initiator. In other words, the monomer and initiator may be added to the heated propylene polymer material at the same time or the monomer may be added 1) after the addition of the initiator has been completed, 2) after addition of the initiator has started but has not yet been completed, or 3) after a delay time or hold time subsequent to the completion of the initiator addition.

After the propylene polymer material has been grafted, the resultant grafted propylene polymer material, while still maintained in a substantially non-oxidizing environment, is treated, preferably by heating at a temperature of at least 120° C. for at least 20 minutes, to decompose any unreacted initiator and deactivate residual free radicals therein. Any unreacted grafting monomer is removed from said material, either before or after the radical deactivation, or at the same time as deactivation. The styrenic grafted propylene polymer material, component (b), is present in the amount of from 30 to 75%, based on the total composition, except in the compositions containing optional component (d). When component (d) is present, component (b) is present in the amount of 5 to 30%, and preferably from 10 to 25%, based on the total composition. In either case, the styrenic grafted propylene polymer material has from 5 to 70% of the styrenic monomer grafted or graft polymerized thereto, and preferably from 10 to 55%.

Component (c) according to the present invention is selected from one or more monoalkenyl aromatic hydrocarbon-conjugated diene block copolymers of linear or branched A-B or A-B-A types or radial (A-B)$_n$ where n=3−20, and hydrogenated products thereof or mixtures thereof, where A is a monoalkenyl aromatic hydrocarbon polymer block and B is a conjugated diene polymer block. Typical monoalkenyl aromatic hydrocarbon monomers are styrene, $C_{1-4}$ linear or branched alkyl ring-substituted styrene and vinyl toluene. Suitable conjugated dienes are butadiene and isoprene.

According to the present invention mixtures of component (c) are selected from the group consisting of (i) two or more of the monoalkenyl aromatic hydrocarbon-conjugated diene block copolymers, (ii) two or more hydrogenated derivatives thereof and (iii) at least one monoalkenyl aromatic hydrocarbon-conjugated diene block copolymer and at least one hydrogenated derivative thereof.

The monoalkenyl aromatic hydrocarbon-conjugated diene block copolymers have a number average molecular weight of from 45,000 to 260,000 wherein the proportion of the monoalkenyl aromatic hydrocarbon monomer in the monoalkenyl aromatic hydrocarbon-conjugated diene block copolymer (c) ranges from 5 to 50%, preferably from 15 to 40%, and more preferably from 25 to 40%. When component (c) is a mixture, two or more block copolymers or hydrogenated products thereof in various amounts and types can be used. When a mixture is used it is preferably a 50/50 mixture.

The monoalkenyl aromatic hydrocarbon-conjugated diene block copolymer and their hydrogenated derivatives used in the composition of the present invention are commercially available. The linear block copolymers are preferred.

The block copolymers can be synthesized according to the methods in U.S. Pat. No. 3,459,830 and 3,994,856. The method for hydrogenation of the conjugated diene block is also known in the art. The hydrogenation catalyst which can be used includes noble metal catalyst, such as platinum, nickel catalyst and copper-chromium catalyst. Specific examples of the methods for hydrogenation are described in U.S. Pat. No. 4,188,432.

The monoalkenyl aromatic hydrocarbon-conjugated diene block copolymer is present in the resin composition in an amount of from 1 to 15% by weight based on the total composition, and preferably from about 4 to 12% by weight.

The propylene polymer material useful in the present invention as component (d) includes crystalline homopolymers of propylene, random copolymers of propylene with other alpha-olefin(s) or diene monomers, random terpolymers of propylene with two different monomers selected from the group consisting of ethylene, other alpha-olefins and diene monomers wherein at least one different monomer is ethylene or other alpha-olefin, and impact-modified propylene polymers. These polymer materials generally have a crystallinity (by x-ray diffraction) of about 15% or greater.

The other alpha-olefins useful in the preparation of the random copolymers of propylene include ethylene and $C_4$-$C_{10}$ alpha-olefins. When ethylene is the other alpha-olefin, the ethylene content is no more than about 10%, preferably about 4%, and when the other alpha-olefin is $C_4$-$C_{10}$, the content is no more than about 20%, preferably about 16%. The diene monomer of the random copolymer of propylene can be a $C_4$-$C_{10}$ linear diene, such as butadiene and decadiene, wherein the copolymer has a diene content up to about 5%, preferably about 4%. Butadiene is preferred.

In the random terpolymer of propylene and ethylene with other alpha-olefins or propylene with two different other alpha-olefins, the other alpha-olefins can be $C_4$-$C_{10}$ alpha-olefins. The propylene/ethylene/other alpha-olefins random terpolymers have a maximum ethylene content of 5%, preferably 3%, and a maximum $C_4$-$C_{10}$ alpha-olefin content of 20%, preferably 16%. In the propylene/two different other alpha-olefins terpolymers, the total content of the other alpha-olefins is 25%, preferably 19%. The random terpolymers of propylene and ethylene or other alpha-olefins with a diene monomer contains from up to 5% of a diene monomer, such as 4-ethylidene-2-norbornene and dicyclopentadiene.

The $C_4$-$C_{10}$ alpha-olefins useful in the preparation of the random and terpolymers of propylene can be linear or branched, such as 1-butene, 1-pentene, 4-methylpentene-1, 3-methyl-1-butene, 1-hexene, 3,4-dimethyl-1-butene and 1-octene.

The impact-modified propylene polymers comprise a homopolymer of propylene or a random copolymers of propylene with ethylene or a $C_4$-$C_{10}$ alpha-olefins as described above, which is impact-modified with 10-60% of ethylene-propylene copolymer rubber (EPR) or ethylenepropylene non-conjugated diene monomer rubber (EPDM) having an ethylene content of 20-70%, and in the case of EPDM a diene content of 2-8%.

Exemplary non-conjugated dienes include 1,4-hexadiene, 5-ethylidene-norbornene and dicyclopentadiene.

The impact-modified propylene polymer can be prepared by first polymerizing the propylene or a random copolymer of propylene and then polymerizing the propylene and ethylene with or without a diene monomer in the presence of the homopolymer of propylene or a random copolymer of propylene. The impact-modified propylene polymer can be produced in a single reactor or series of reactors. In the alternative, the propylene homopolymer or random copolymer with an alpha-olefin(s) or a diene, and the EPR or EPDM can be prepared separately and then mixed by melt-kneading.

The preferred propylene polymer materials are crystalline propylene homopolymer and ethylene/propylene rubber impact modified polypropylene homopolymer.

The propylene polymer material is present in an amount of 1 to 70% of the total composition, and preferably, from 5 to 55%.

The propylene polymer backbone of the grafted copolymer and the propylene polymer material per se, when present, form the continuous or matrix phase of the compositions of this invention. The other components of the compositions, including the styrenic grafted portion of the graft copolymer, are dispersed in the continuous phase, or put another way, form the dispersed phase.

The compositions of the present invention are prepared by mechanically blending the components in conventional mixing equipment, i.e., a single or twin screw extruder, Banbury mixer or any other conventional melt compounding equipment. The order in which the components of the composition are mixed is not critical.

The present invention will be illustrated in greater detail with reference to the examples of the invention set forth below.

EXAMPLES 1-4, 8-13, 19, 20, 22, 23, 27-30, AND 32-35

The compositions of this invention are produced by a general procedure comprising mechanically blending components (a), (b), (c) and (d) as set forth in Table 1 in a Henschel mill until a homogenous mixture is obtained (approximately three minutes). The mixture was then compounded at 575° F. in a vacuum vented, 50 mm, counter-rotating, intermeshing twin screw extruder manufactured by Packaging Industries. The compounded mixture was injection molded in a 1.5 ounce, 25 ton Battenfeld injection molding machine with a barrel temperature of 575° F. and mold temperature of 140° F. The molding cycle for the tensile and flex bars consisted of a 10 second injection time, 25 second cooling time and 5 second mold open time. For the impact plaques the injection time was increased to 15 seconds.

The compositions of comparative examples 5-7, 14-18, 21, 24-26 and 31 were produced in the same manner as set forth above for the examples.

The physical properties set forth in the Tables were measured by the following methods:

| | |
|---|---|
| Tensile Strength | ASTM D-638 |
| Break Elongation | ASTM D-638 |
| Yield Elongation | ASTM D-638 |
| Flexural Modulus | ASTM D-790 |
| Flexural Strength | ASTM D-790 |
| Hardness | ASTM D-785 |
| HDT | ASTM D-648 |
| Notched Izod | ASTM D-256 |

Plate Impact - Measured by using a Rheometrics automatic impact tester (Model RIT 8000), having a ½ inch diameter tup and a 2½ inch diameter backing ring to support the impact plaque. The test was performed at 23° C., at a constant speed of 2.2 meters/second using 3×3×0.125 inch impact plaques. Break energies were computer calculated from the area under force vs. deflection curves. Surface Appearance—Surfaces of injection molded impact plaques were visually examined for swirls and grainy appearance. The impact plaques were rated according to the following scale:
4—Excellent, no swirls or graininess
3—Good, slight swirls
2—Fair, pronounced swirls, slight graininess
1—Poor, pronounced swirls and graininess

TABLE 1

| Composition | Example No. | | | | Comparative Example No. | | |
|---|---|---|---|---|---|---|---|
| | 1 | 2 | 3 | 4 | 5 | 6 | 7 |
| Polypropylene[1] | 64 | 44 | 34 | 24 | 50 | 44 | 40 |
| Polyphenylene Ether | 20 | 40 | 50 | 60 | 50 | 50 | 50 |
| SEBS[2] | 6 | 6 | 6 | 6 | — | 6 | — |
| PS-g-PP[3] | 10 | 10 | 10 | 10 | — | — | 10 |
| Tensile Strength (psi) | 4474 | 5658 | 6185 | 6930 | 6934 | 6061 | 7176 |

TABLE 1-continued

| Composition | Example No. | | | | Comparative Example No. | | |
|---|---|---|---|---|---|---|---|
| | 1 | 2 | 3 | 4 | 5 | 6 | 7 |
| Yield Elongation (%) | 17.9 | 14.6 | 12.6 | 9.3 | 6.9 | 11.3 | 6.3 |
| Break Elongation (%) | 126 | 81 | 40 | 26 | 8 | 103 | 7 |
| Flexural Modulus (psi) | 200000 | 221000 | 225000 | 243000 | 267000 | 213000 | 304000 |
| Flexural Strength (psi) | 7000 | 8100 | 8700 | 10200 | 10700 | 8700 | 11500 |
| HDT @ 66 psi (°C.) | 106 | 133 | 150 | 160 | 161 | 153 | 160 |
| HDT @ 264 psi (°C.) | 58 | 73 | 95 | 119 | 129 | 97 | 129 |
| Notched Izod Impact (ft-lb/in) | 1.3 | 1.8 | 1.9 | 2.2 | 0.7 | 3.6 | 0.3 |
| Unnotched Izod Impact (ft-lb/in) | 35.1 | 35.2 | 37.8 | 40.6 | 15.6 | 34.8 | 12.6 |
| Plate Impact (ft-lb) @ 23° C. | 17.7 | 21.9 | 23.2 | 24.6 | 0.6 | 22.2 | 0.6 |
| Surface Appearance | 4 | 3 | 3 | 2 | 1 | 2 | 1 |

[1] Crystalline propylene homopolymer having a MFR of 5.21 dg/min.
[2] Hydrogenated styrene/butadiene/styrene triblock copolymer, Kraton G1652 supplied by Shell Chemical Co. (29% styrene, 71% rubber).
[3] Styrene grafted polypropylene, 45% styrene content, 2.36 parts of t-butylperoxy-2-ethyl hexanoate/100 parts polypropylene of active peroxide, grafting temp 100 C., styrene 84.4 pph, feed rate 2.3 pph/min for 37 min, deactivation at 132° C. for 4 hours, produced by the peroxide method set forth herein.

In Table 1, Examples 1–4 of the invention show the combined effects of using a monoalkenyl aromatic hydrocarbon-conjugated diene block copolymer and a poly(styrene grafted propylene) copolymer to compatibilize the compositions. The compositions of this invention exhibit a good balance of ductility, surface appearance, impact strength and modulus, and the balance of properties are retained even as the polyphenylene ether resin level is increased.

In contrast, comparative example 5 shows a brittle blend with low impact strength and a poor surface appearance, demonstrating poor compatibility. The addition of a hydrogenated monoalkenyl aromatic hydrocarbon-conjugated diene block copolymer comparative example 6, improves ductility, and impact strength and slightly improves surface appearance, however, the modulus is significantly decreased. When the block copolymer is replaced with poly(styrene grafted propylene) copolymer, comparative example 7, the modulus is increased significantly, but the composition exhibits poor ductility, impact strength and surface appearance.

The compositions set forth in Table 2 were prepared according to the general procedure used for the compositions in Table 1, except that an ethylene-propylene rubber modified polypropylene is used instead of the crystalline propylene homopolymer.

In Table 2 examples 8–13 of the present invention demonstrate a good balance of impact strength, modulus and HDT, in addition to good surface appearance. However, when the poly(styrene grafted propylene) copolymer is used alone, (comparative examples 16 and 18) the blends have low ductility, low impact strength, and poor surface appearance, and when the block copolymer is used alone, (comparative examples 15 and 17), the blends have a low modulus.

TABLE 2

| Composition | Example No. | | | | | |
|---|---|---|---|---|---|---|
| | 8 | 9 | 10 | 11 | 12 | 13 |
| Impact Modified Polypropylene[1] | 66 | 46 | 36 | 15 | 26 | 36 |
| Polyphenylene Ether | 20 | 40 | 50 | 50 | 60 | 25 |
| SEBS[2] | 4 | 4 | 4 | 4 | 4 | 4 |
| PS-g-PP[3] | 10 | 10 | 10 | 30 | 10 | 10 |
| Polystyrene[4] | — | — | — | — | — | 25 |
| Tensile Strength (psi) | 3460 | 4605 | 5362 | 6012 | 5887 | 6325 |
| Yield Elongation (%) | 9.0 | 15.6 | 15.1 | 11.9 | 12.4 | 6.4 |
| Break Elongation (%) | 49 | 23 | 23 | 17 | 23 | 18 |
| Flexural Modulus (psi) | 190000 | 214000 | 217000 | 259000 | 223000 | 277000 |
| Flexural Strength (psi) | 5900 | 7100 | 7700 | 9300 | 8100 | 10100 |
| HDT @ 66 psi (°C.) | 103 | 125 | 143 | 143 | 149 | 123 |
| HDT @ 264 psi (°C.) | 55 | 66 | 91 | 98 | 97 | 95 |
| Notched Izod Impact (ft-lb/in) | 1.2 | 1.1 | 1.6 | 1.1 | 1.8 | 1.0 |
| Unnotched Izod. Impact (ft-lb/in) | 32.0 | 35.8 | 39.1 | 38.9 | 34.7 | 32.3 |
| Plate Impact (ft-lb) @ 23°C. | 15.4 | 10.9 | 12.7 | 12.5 | 15.7 | 5.3 |
| Surface Appearance | 4 | 3 | 3 | 2 | 2 | 2 |

| Composition | Comparative Example No. | | | | |
|---|---|---|---|---|---|
| | 14 | 15 | 16 | 17 | 18 |
| Impact Modified Polypropylene[1] | 50 | 46 | 40 | 36 | 36 |
| Polyphenylene Ether | 50 | 50 | 50 | 50 | 50 |
| SEBS[2] | — | 4 | — | 14 | — |
| PS-g-PP[3] | — | — | 10 | — | 14 |
| Polystyrene[4] | — | — | — | — | — |
| Tensile Strength (psi) | 5662 | 5311 | 5739 | 5283 | 5830 |
| Yield Elongation (%) | 5.5 | 13.0 | 5.6 | 28.7 | 5.5 |
| Break Elongation (%) | 6 | 30 | 6 | 105 | 6 |
| Flexural Modulus (psi) | 241000 | 190000 | 273000 | 127000 | 283000 |
| Flexural Strength (psi) | 9200 | 7200 | 9500 | 5100 | 9800 |

TABLE 2-continued

|  |  |  |  |  |  |
|---|---|---|---|---|---|
| HDT @ 66 psi (°C.) | 160 | 140 | 153 | 122 | 154 |
| HDT @ 264 psi (°C.) | 117 | 76 | 116 | 58 | 117 |
| Notched Izod Impact (ft-lb/in) | 0.7 | 3.1 | 0.3 | 10.3 | 0.5 |
| Unnotched Izod. Impact (ft-lb/in) | 11.6 | 34.6 | 10.2 | 19.5 | 10.6 |
| Plate Impact (ft-lb) @ 23°C. | 0.5 | 15.7 | 0.6 | 24.4 | 0.8 |
| Surface Appearance | 2 | 3 | 2 | 4 | 2 |

[1]Ethylene-propylene impact-modified polypropylene, with 14% rubber having 8.5% ethylene, and a MFR of 3.5 dg/min.
[2]Hydrogenated styrene/butadiene/styrene triblock copolymer, Kraton G1562 produced by Shell Chemical Co. (29% styrene, 71% rubber).
[3]Styrene grafted polypropylene, 45% styrene content, 2.36 parts of t-butylperoxy-2-ethyl hexanoate/100 parts polypropylene of active peroxide, grafting temp 100°C., styrene 84.4 pph, feed rate 2.3 pph/min for 37 min., deactivation at 132° C. for 4 hours, produced by peroxide method of grafting set forth herein.
[4]Polystyrene having a MFR of 8.49 dg/min.

The compositions set forth in Table 3 were prepared according to the general procedure used for the compositions in Table 1, except that a poly(styrene grafted propylene) copolymer by the radiation method set forth herein was used instead of the poly(styrene grafted propylene) copolymer produced by the peroxide method set forth herein.

It can be seen that in the compositions of the invention, examples 19 and 20, that a good balance of properties is observed in particular stiffness/impact, whereas, in the compositions of the comparative examples 14, 15 and 21 this balance is not seen.

Again, the compositions of the invention, examples 22 and 23, demonstrate better impact and stiffness balance when the poly(styrene grafted propylene) copolymer and the hydrogenated monoalkenyl aromatic hydrocarbon-conjugated diene block copolymer are used in the combination as compared to the compositions of the comparative examples 24–26. It can be seen that the composition with polypropylene and polystyrene only, comparative example 24, is brittle and exhibits low ductility and impact strength, but has high modulus. When the block copolymer is used alone, comparative example 25, the impact and ductility increased, how-

TABLE 3

|  | Example No. |  | Comparative Example No. |  |  |
|---|---|---|---|---|---|
| composition | 19 | 20 | 14 | 15 | 21 |
| Impact-Modified Polypropylene[1] | 36 | 26 | 50 | 46 | 40 |
| Polyphenylene Ether | 50 | 60 | 50 | 50 | 50 |
| SEBS[2] | 4 | 4 | — | 4 | — |
| PS-g-PP[3] | 10 | 10 | — | — | 10 |
| Tensile Strength (psi) | 4947 | 5767 | 5662 | 5311 | 5200 |
| Yield Elongation (%) | 16.7 | 15.2 | 5.5 | 13.0 | 5.3 |
| Break Elongation (%) | 22 | 20 | 6 | 30 | 7.0 |
| Flex Modulus (psi) | 207000 | 231000 | 241000 | 190000 | 283000 |
| Flex Strength (psi) | 7379 | 8548 | 9200 | 7200 | 9015 |
| HDT @ 66 psi (°C.) | 134 | 148 | 160 | 140 | 149 |
| HDT @ 264 psi (°C.) | 91 | 94 | 117 | 76 | 100 |
| Notched Izod Impact (ft-lb/in) | 1.6 | 1.8 | 0.7 | 3.1 | 0.5 |
| Unnotched Izod Impact (ft-lb/in) | 34.3 | 37.9 | 11.6 | 34.6 | 8.9 |
| Plate Impact (ft-lb) @ 23° C. | 10.2 | 10.7 | 0.5 | 15.7 | 0.4 |

[1]Ethylene-propylene rubber modified polypropylene, with 14% rubber having 8.5% ethylene, and a MFR 3.5 dg/min.
[2]Hydrogenated styrene/butadiene/styrene triblock copolymer Kraton G1652 produced by Shell Chemical Co. (29% styrene, 71% rubber).
[3]Styrene grafted polypropylene, 30% styrene content, Mrad 4 at 23° C., styrene 43.0 pph for 3 minutes, deactivation at 140° C. for 30 mins., produced by radiation method of grafting set forth herein.

In Table 4, the compositions were prepared according to the general procedure used for the compositions in Table 1, except that polystyrene was used instead of polyphenylene ether.

ever, the loss in modulus is severe. In comparative example 26 where only poly(styrene grafted propylene) copolymer is used, the modulus is high but the ductility and impact strength are low.

TABLE 4

|  | Example No. |  | Comparative Example No. |  |  |
|---|---|---|---|---|---|
| Composition | 22 | 23 | 24 | 25 | 26 |
| Polypropylene[1] | 40 | 55 | 65 | 65 | 55 |
| Polystyrene[2] | 25 | 30 | 35 | 30 | 35 |
| SEBS[3] | 5 | 5 | — | 5 | — |
| PS-g-PP[4] | 30 | 10 | — | — | 10 |
| Tensile Strength (psi) | 5442 | 5450 | 5883 | 5233 | 6224 |
| Yield Elongation (%) | 5.8 | 6.1 | 4.2 | 7.2 | 3.3 |
| Break Elongation (%) | 37.0 | 42.0 | 4.2 | 44.0 | 3.3 |
| Flexural Modulus (psi) | 296000 | 296000 | 300700 | 244200 | 309300 |
| Flexural Strength (psi) | 9000 | 9700 | 9500 | 8700 | 10600 |
| HDT @ 66 psi (°C.) | 92 | 90 | 92 | 90 | 94 |
| HDT @ 264 psi (°C.) | 68 | 70 | 72 | 70 | 73 |
| Notched Izod Impact | 0.3 | 0.8 | 0.4 | 0.6 | 0.3 |

TABLE 4-continued

| Composition | Example No. | | Comparative Example No. | | |
|---|---|---|---|---|---|
| | 22 | 23 | 24 | 25 | 26 |
| (ft-lb/in) | | | | | |
| Hardness (Rockwell) | 93 | 98 | 108 | 87 | 104 |

(1)Crystalline propylene homopolymer having a MFR of 3.97 dg/min.
(2)Polystyrene having a MFR of 8.49 dg/min.
(3)Hydrogenated styrene/butadiene/styrene triblock copolymer, Kraton G1652 produced by Shell Chemical Co. (29% styrene content, 71% rubber).
(4)Styrene grafted polypropylene, 31% styrene content, 1 part t-butylperoxy-2-ethylhexanoate/100 parts polypropylene of active peroxide, grafting temp. 100° C., styrene 53.8 pph, feed rate 1.8 pph/min for 30 min. deactivation at 132° C. for 4 hours, produced by peroxide method of grafting set forth herein.

The compositions set forth in Table 5 were prepared according to the general procedure used for the compositions in Table 1, except that optional component (d), propylene polymer material, was not present.

Examples 27–30 of the present invention show a significant improvement in stiffness/impact balance over that of comparative example 31.

The compositions set forth in Table 6 were prepared according to the general procedure used for the compositions in Table 1, except that two hydrogenated monoalkenyl aromatic hydrocarbon-conjugated diene block copolymers were used, instead of only one.

The compositions of examples 32–35 demonstrate improved HDT/stiffness/impact balance over that of comparative example 31.

TABLE 5

| Composition | Example No. | | | | Comparative Ex. |
|---|---|---|---|---|---|
| | 27 | 28 | 29 | 30 | 31 |
| Polyphenylene Ether | 30 | 40 | 50 | 60 | 50 |
| SEP(1) | — | — | — | — | — |
| SEBS(2) | 10 | 10 | 10 | 10 | — |
| SEBS(3) | — | — | — | — | — |
| PS-g-pp(4) | 60 | 50 | 40 | — | — |
| PS-g-pp(5) | — | — | — | 30 | 50 |
| Tensile Strength (psi) | 5290 | 5647 | 6036 | 6441 | 5469 |
| Yield Elongation (%) | 4.4 | 6.6 | 26.3 | 18 | 5.4 |
| Break Elongation (%) | 41 | 42 | 39 | 28 | 9.0 |
| Flexural Modulus (psi) | 192000 | 194000 | 196000 | 211000 | 340000 |
| Flexural Strength (psi) | 7413 | 7635 | 8270 | 8619 | 10500 |
| HDT @ 66 psi | 115 | 125 | 138 | 151 | 139 |
| HDT @ 264 psi | 79 | 79 | 104 | 105 | 97 |
| Notched Izod Impact (ft-lb/in) | 1.9 | 2.0 | 2.9 | 2.4 | 0.6 |
| Unnotched Izod Impact (ft-lb/in) | 37 | 37 | 35 | 39 | — |
| Plate Impact (ft-lb) @ 23° C. | 24.3 | 20.8 | 26.1 | 26.9 | — |

(1)Hydrogenated styrene/isoprene diblock copolymer Kraton G 1702 produced by Shell Chemical Co. (37% styrene, 63% rubber).
(2)Hydrogenated styrene/butadiene/styrene triblock copolymer, Kraton G 1652 produced by Shell Chemical Co. (29% styrene, 71% rubber).
(3)Hydrogenated styrene/butadiene/styrene triblock copolymer, Kraton G 1651 produced by Shell Chemical Co. (29% styrene, 71% rubber).
(4)Styrene grafted polypropyene, 45% styrene content, (1.57 parts of t-butylperoxy-2-ethyl hexanoate/100 parts) polypropylene of active peroxide, grafting temp. 100° C., styrene 84.4 pph, feed rate 2.4 pph/min for 35 min, deactivation at 135° C. for 3 hours produced by the peroxide method set forth herein.
(5)Styrene grafted polypropylene, 35% styrene content, 1 part of t-butylperoxy-2-ethyl hexanoate/100 parts polypropylene of active peroxide, grafting temp. 102° C, styrene 53.8 pph, feed rate 1.8 pph/min for 30 min. deactivation at 132° C. for 4 hours produced by the peroxide method set forth herein.

TABLE 6

| Composition | Example No. | | | | Comparative Ex. |
|---|---|---|---|---|---|
| | 32 | 33 | 34 | 35 | 31 |
| Impact modified polypropylene(1) | 16 | 5 | — | — | — |
| Polyphenylene Ether | 50 | 50 | 50 | 50 | 50 |
| SEP(2) | 5 | 5 | 5 | 5 | — |
| SEBS(3) | — | — | — | 5 | — |
| SEBS(4) | 5 | 5 | 5 | — | — |
| PS-g-pp(5) | — | — | — | — | 50 |
| PS-g-pp(6) | 24 | 35 | 40 | 40 | — |
| Tensile Strength (psi) | 4321 | 4800 | 5665 | 5916 | 5469 |
| Yield Elongation (%) | 4.9 | 4.7 | 5.1 | 4.9 | 5.4 |
| Break Elongation (%) | 13.6 | 12.4 | 11 | 8 | 9.0 |
| Flexural Modulus (psi) | 231000 | 251000 | 291000 | 310000 | 340000 |
| Flexural Strength (psi) | 7290 | 8140 | 9587 | 9986 | 10500 |
| HDT @ 66 psi | 140 | 143 | 146 | 145 | 139 |
| HDT @ 264 psi | 98.5 | 91 | 114 | 107 | 97 |
| Notched Izod Impact | 1.4 | 1.7 | 2.1 | 1.4 | 0.6 |

TABLE 6-continued

| | Example No. | | | | Comparative Ex. |
|---|---|---|---|---|---|
| Composition | 32 | 33 | 34 | 35 | 31 |
| (ft-lb/in) | | | | | |

(1)Ethylene - propylene impact modified polypropylene, with 14% rubber having 8.5% ethylene, and a MFR of 3.5 dg/min.
(2)Hydrogenated styrene/isoprene diblock copolymer, Kraton G 1702 produced by Shell Chemical Co. (37% styrene, 63% rubber).
(3)Hydrogenated styrene/butadiene/styrene triblock copolymer, Kraton G 1652 produced by Shell Chemical Co. (29% styrene, 71% rubber).
(4)Hydrogenated styrene/butadiene/styrene triblock copolymer, Kraton G 1651 produced by Shell Chemical Co. (29% styrene, 71% rubber).
(5)Styrene grafted polypropylene, 35% styrene content, 1 part of t-butylperoxy-2-ethyl hexanoate/100 parts polypropylene of active peroxide, grafting temp. 102° C., styrene 53.8 pph, feed rate 1.8 pph/min for 30 min, deactivation at 132° C. for 4 hours, produced by the peroxide method set forth herein.
(6)Styrene grafted polypropylene, 34% styrene content, 1 part of t-butylperoxy-2-ethyl hexanoate/100 parts polypropylene of active peroxide, grafting temp. 103° C., styrene 53.8 pph, feed rate 1.8 pph/min for 30 min, deactivation at 132° C. for 4 hours, produced by the peroxide method set forth herein.

As demonstrated above, the compositions in which the monoalkenyl aromatic hydrocarbon-conjugated diene block copolymer and the styrenic grafted propylene polymer material are used in combination have a better overall balance of properties and surface appearance than the compositions where they are used alone or not at all.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A composition comprising, by weight, (a) from 10 to 65% of a resin material selected from the group consisting of (i) a polyphenylene ether resin, (ii) a styrene resin or (iii) mixtures thereof having 2 to 98% by weight of styrene resin based on the total amount of polyphenylene ether resin and styrene resin; (b) from 5 to 30% of a styrenic grafted propylene polymer material having a styrenic monomer content of 5 to 70% obtained from a process comprising:
   (1) irradiating the propylene polymer material at a temperature in the range of from 10° C. to 85° C. with high-energy ionizing radiation to produce free-radical sites in the propylene polymer materials;
   (2) treating the irradiated propylene polymer material at a temperature up to 100° C. for a period of at least about 3 minutes, with about from 5 to 80% by weight, based on the total weight of propylene polymer and styrenic monomers, of styrenic monomer;
   (3) simultaneously or successively, in either order, deactivating substantially all residual free radicals in the resultant grafted propylene polymer material; and removing any unreacted grafting monomer from said material; or a process comprising:
   (1) treating the propylene polymer material at a temperature of from 60° C. to 125° C. with from 0.1 to 6.0 parts per hundred of an organic compound which is a free-radical polymerization initiator having a decomposition half-life of about 1 to 240 minutes at the temperature employed;
   (2) over a time period which coincides with, or follows, the period of initiator treatment, with or without overlap, treating the propylene polymer material with about 5 to 240 pph of styrenic monomer;
   (3) simultaneously or successively, in either order, deactivating substantially all residual free radicals in the resultant grafted propylene polymer material; and removing any unreacted grafting monomer from said material;

(c) from 1 to 15% of one or more monoalkenyl aromatic hydrocarbon-conjugated diene block copolymers, hydrogenated products thereof or mixtures thereof, and (d) from 1 to 70% of a propylene polymer material, wherein the total amount of (a)+(b)+(c)+(d) is 100%, and wherein said grafted propylene polymer material is prepared from a propylene polymer material having a pore volume fraction of at least about 0.07 wherein more than 40% of the pores have a diameter larger than 1 micron, a surface area of at least 0.1 $m^2/g$, and a weight average diameter in the range of about from 0.4 to 7 mm.

2. The composition of claim 1 wherein (a) is present in an amount from 20 to 60%.

3. The composition of claim 1 wherein component (a) is a polyphenylene ether resin present in an amount of from 20 to 60%.

4. The composition of claim 1, wherein component (a) is a mixture of polyphenylene ether resin and 2 to 98% of a styrene resin, based on the polyphenylene ether resin and styrene resin.

5. The composition of claim 1 wherein component (b) is a styrenic grafted propylene polymer material selected from the group consisting of a graft copolymer of styrene on polypropylene backbone, a graft copolymer of styrene on ethylene/propylene random copolymer backbone, a graft copolymer of styrene on ethylene/propylene rubber impact-modified polypropylene backbone, a graft copolymer of styrene/alpha-methylstyrene on ethylene/propylene rubber impact-modified polypropylene backbone, a graft copolymer of styrene/alpha-methylstyrene on ethylene/propylene random copolymer backbone and a graft copolymer of styrene/alpha-methylstyrene on polypropylene backbone.

6. The composition of claim 5 wherein the styrenic monomer content of the graft copolymer is from 10 to 55%.

7. The composition of claim 1 wherein component (c) is one or more monoalkenyl aromatic hydrocarbon-conjugated diene block copolymer of a linear or branched A-B, A-B-A or radial (A-B)$_n$ type, hydrogenated products thereof or mixtures thereof, wherein A is monoalkenyl aromatic hydrocarbon polymer block, B is a conjugated diene polymer block and n=3—20.

8. The composition of claim 7, wherein component (c) is of the A-B-A type or a 50/50 mixture of a hydrogenated monoalkenyl aromatic hydrocarbon-conjugated diene of the A-B-A type and of the A-B type or two A-B-A types.

9. The composition of claim 1 wherein component is a propylene polymer material selected from the group consisting of a propylene homopolymer, a random copolymer of propylene and other alpha-olefins, a random terpolymer of propylene with two different monomers selected from the group consisting of ethylene, other alpha-olefins and diene monomers wherein at least one different monomer is ethylene or other alpha-olefin, and an impact-modified homopolymer of propylene or random copolymer of propylene.

10. The composition of claim 1 wherein (d) is present in an amount of from 5 to 55%.

11. The composition of claim 1 wherein said propylene polymer material of component (d) is a propylene homopolymer present in an amount of from 5 to 55%.

12. The composition of claim 1 wherein, by weight, (a) is present in an amount of from 20 to 60%, (b) is present in an amount of from 10 to 25%, (c) is present in an amount of from 4 to 12%, and (d) is present in an amount of from 5 to 55%.

13. The composition of claim 1 wherein (a) is a polyphenylene ether resin, (b) is a styrenic grafted propylene polymer material having a styrene level of 10 to 55%, (c) is one or more monoalkenyl aromatic hydrocarbon-conjugated diene block copolymers, hydrogenated product thereof or mixtures thereof, and (d) is a crystalline propylene homopolymer, 14. A composition comprising, by weight, (a) from 10 to 65% of a resin material selected from the group consisting of (i) a polyphenylene ether resin, (ii) a styrene resin or (iii) mixtures thereof having 2 to 98% by weight of styrene resin based on the total amount of polyphenylene ether resin and styrene resin; (b) from 30 to 75% of a styrenic grafted propylene polymer material having a styrenic monomer content of 5 to 70% obtained from a process comprising:

(1) irradiating the propylene polymer material at a temperature in the range of from 10° C. to 85° C. with high energy ionizing radiation to produce free-radical sites in the propylene polymer materials;

(2) treating the irradiated propylene polymer material at a temperature up to 100° C. for a period of at least about 3 minutes, with about from 5 to 80% by weight, based on the total weight of propylene polymer and styrenic monomers, of styrenic monomer;

(3) simultaneously or successively, in either order, deactivating substantially all residual free radicals in the resultant grafted propylene polymer material; and removing any unreacted grafting monomer from said material; or a process comprising:

(1) treating the propylene polymer material at a temperature of from 60° C. to 125° C. with from 0.1 to 6.0 parts per hundred of an organic compound which is a free-radical polymerization initiator having a decomposition half-life of about 1 to 240 minutes at the temperature employed;

(2) over a time period which coincides with, or follows, the period of initiator treatment, with or without overlap, treating the propylene polymer material with about 5 to 240 pph of styrenic monomer;

(3) simultaneously or successively, in either order, deactivating substantially all residual free radicals in the resultant grafted propylene polymer material; and removing any unreacted grafting monomer from said material;

(c) from 1 to 15% of one or more monoalkenyl aromatic hydrocarbon-conjugated diene block copolymers, hydrogenated products thereof or mixtures thereof, wherein the total amount of (a)+(b)+(c) is 100%, and wherein said grafted propylene polymer material is prepared from a propylene polymer material in spherical particulate form having a pore volume fraction of at least about 0.07 wherein more than 40% of the pores have a diameter larger than 1 micron, a surface area of at least 0.1 m$^2$/g, and a weight average diameter in the range of about from 0.4 to 7 mm.

15. The composition of claim 14 wherein component (a) is present in an amount of from 20 to 60%.

16. The composition of claim 14 wherein component (a) is a polyphenylene ether resin.

17. The composition of claim 14 wherein component (a) is a mixture of polyphenylene ether resin and 2 to 98% of a styrene resin, based on the total amount of polyphenylene ether resin and styrene resin.

18. The composition of claim 14 wherein component (b) is a styrenic grafted propylene polymer material selected from the group consisting of a graft copolymer of styrene on polypropylene backbone, a graft copolymer of styrene on ethylene/propylene random copolymer backbone, a graft copolymer of styrene on ethylene/propylene rubber impact-modified polypropylene backbone, a graft copolymer of styrene/alpha-methylstyrene on polypropylene backbone, a graft copolymer of styrene/alpha-methylstyrene on ethylene/propylene random copolymer backbone and a graft copolymer of styrene/alpha-methylstyrene on ethylenepropylene rubber impact-modified polypropylene backbone.

19. The composition of claim 18 wherein the styrenic monomer content of the graft copolymer is from 10 to 55%.

20. The composition of claim 14 wherein component (c) is one or more monoalkenyl aromatic hydrocarbon-conjugated diene block copolymer of a linear or branched A-B, A-B-A or radial (A-B)$_n$ type, hydrogenated products thereof or mixtures thereof, wherein A is monoalkenyl aromatic hydrocarbon polymer block, B is a conjugated diene polymer block and n=3−20.

21. The composition of claim 20 wherein component (c) is of the A-B-A type or a 50/50 mixture of a hydrogenated monoalkenyl aromatic hydrocarbon-conjugated diene block copolymer of the A-B-A type and A-B type or two A-B-A types.

22. The composition of claim 14 wherein component (c) is present in an amount of from 4 to 12%.

23. The composition of claim 14 wherein (a) is present in an amount of from 20 to 60%, (b) is present in an amount of from 30 to 65% and (c) is present in an amount of from 4 to 15%.

24. The composition of claim 14 wherein (a) is a polyphenylene ether resin, (b) is a styrenic grafted propylene polymer material having a styrene content of 10 to 55% and (c) is one or more monoalkenyl aromatic hydrocarbon-conjugated diene block copolymers, hydrogenated products thereof or mixtures thereof.

* * * * *

UNITED STATES PATENT AND TRADEMARK OFFICE
CERTIFICATE OF CORRECTION

PATENT NO. : 5,370,813
DATED : December 6, 1994
INVENTOR(S) : Anthony J. DeNicola, Jr., et. al.

It is certified that error appears in the above-indentified patent and that said Letters Patent is hereby corrected as shown below:

Column 10,

Table 2, across from "Impact Modified" and under "Composition 11", "15" should be --16--.

Table 4, across from "Notched Izod Impact" and under "Composition 22", "0.3" should be --0.8--.

At col. 17, line 4, after "component" insert --(d)--.

Signed and Sealed this

Eleventh Day of July, 1995

Attest:

BRUCE LEHMAN

Attesting Officer

Commissioner of Patents and Trademarks